United States Patent Office 3,625,671
Patented Dec. 7, 1971

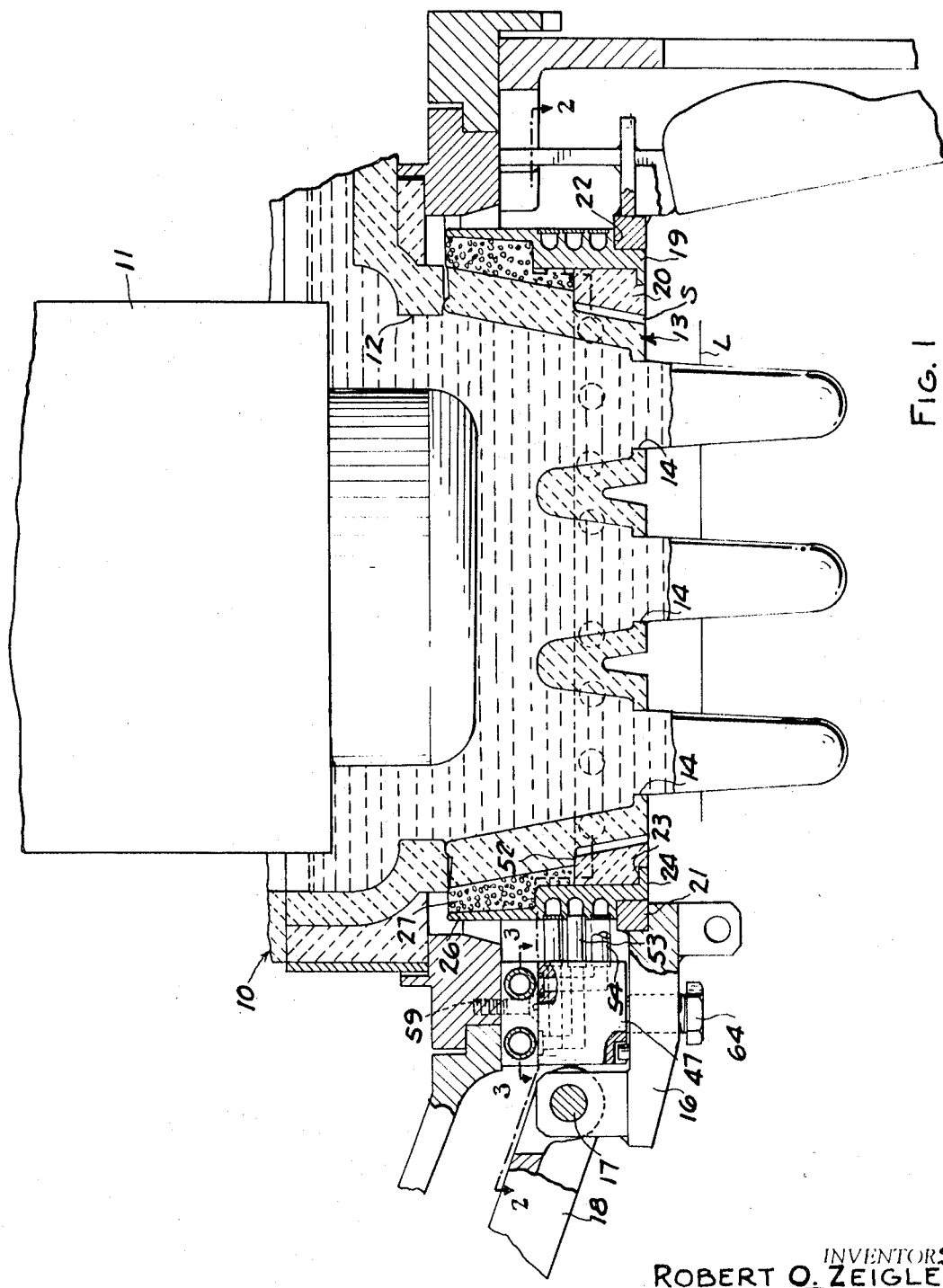

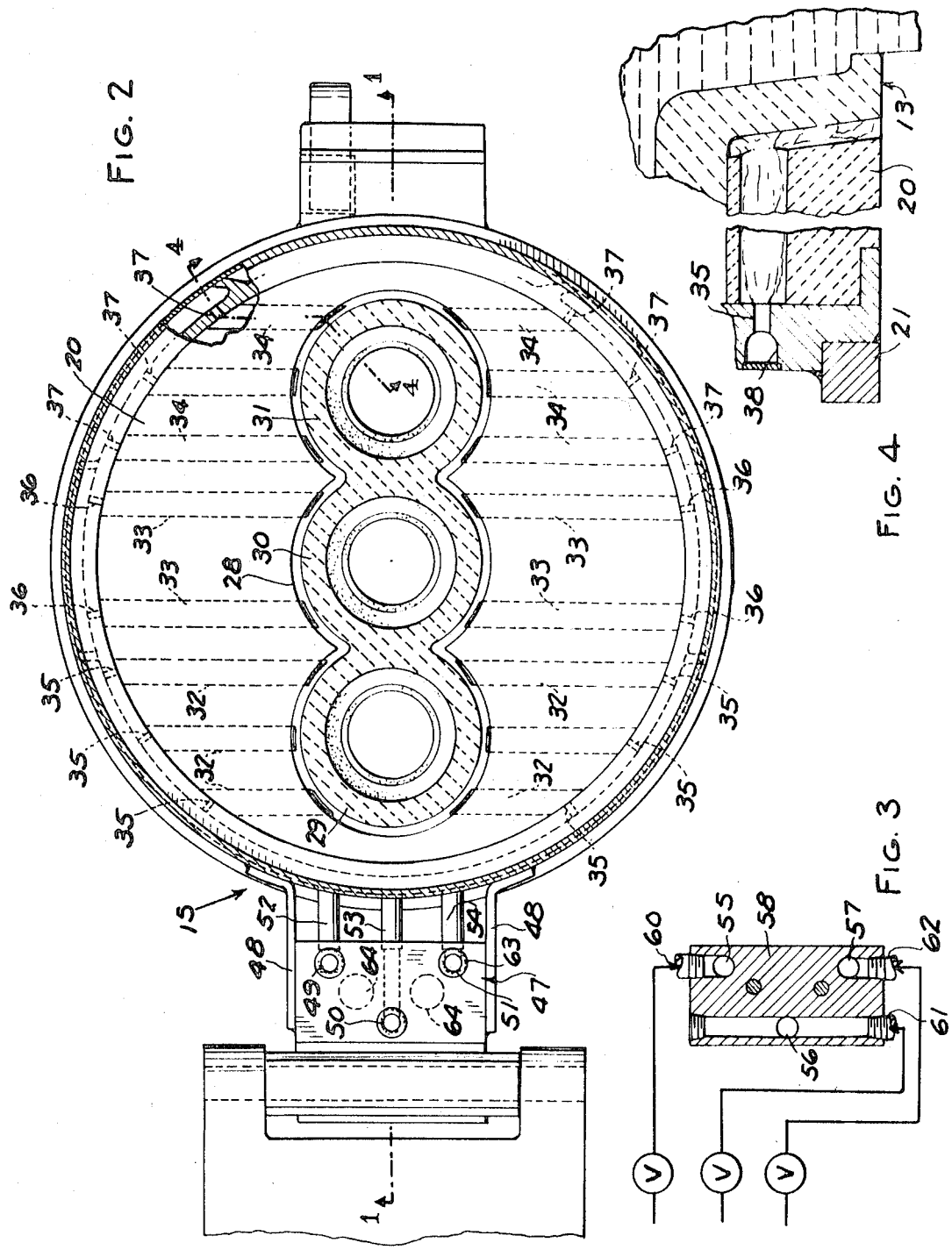

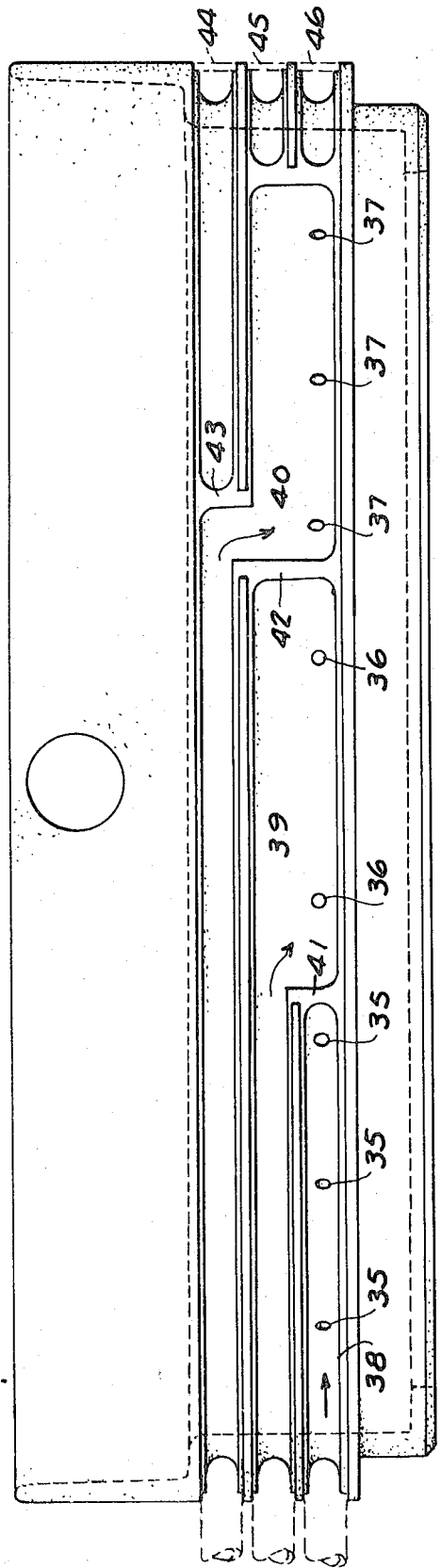

3,625,671
APPARATUS FOR FEEDING GLASS HAVING
MULTIPLE OUTLETS
Helmut T. Schirm, Toledo, and Robert O. Zeigler, Holland, Ohio, assignors to Owens-Illinois, Inc.
Filed Jan. 6, 1969, Ser. No. 789,136
Int. Cl. C03b 5/26
U.S. Cl. 65—326
10 Claims

ABSTRACT OF THE DISCLOSURE

An apparatus for feeding glass comprising a forehearth having an opening therein beneath which an orifice ring assembly is movably mounted. The orifice ring assembly comprises an orifice pan in which an insert is positioned that, in turn, supports an orifice ring which has a plurality of orifices through which glass is delivered. The orifice pan and insert have interconnecting passages for selectively supplying and controlling the combustion of gases provided between the periphery of each orifice in the orifice ring and the insert.

---

This invention relates to the feeding of glass from a molten body and particularly to the control of the temperature of the orifice ring through which the charge of glass is delivered.

In the feeding of charges of molten glass from a forehearth or the like, it is well known to direct the glass periodically through an opening and sever a charge from the remainder of the molten mass. In the delivery of the charge, it is important from the standpoint of proper control of weight and shape of the charge to control the temperature. Where a plurality of charges are simultaneously fed from the same molten mass, the problem of control is more difficult since the relative positions of the charges with respect to the molten mass of glass varies.

Accordingly, among the objects of the present invention are to provide an apparatus for simultaneously feeding multiple charges of molten glass from a mass of molten glass wherein the temperature of each charge can be selectively controlled thereby controlling the weight and shape of the charge; wherein the apparatus is capable of performing these functions with minimum maintenance; and wherein the apparatus may be readily removed and replaced with other apparatus, for example, for feeding a single charge of molten glass.

SUMMARY

In accordance with the invention, an orifice ring assembly is mounted beneath the opening of a forehearth. The orifice ring assembly comprises an orifice pan in which an insert is positioned that, in turn, supports an orifice ring which has a plurality of orifices through which glass is delivered. The orifice pan and inert have interconnecting passages for selectively supplying and controlling the combustion of gases provided between the periphery of each orifice in the orifice ring and insert.

DESCRIPTION OF THE DRAWING

FIG. 1 is a fragmentary vertical sectional view of an apparatus embodying the invention.

FIG. 2 is a fragmentary sectional view taken along the line 2—2 in FIG. 1.

FIG. 3 is a fragmentary sectional view taken along the line 3—3 in FIG. 1.

FIG. 4 is a fragmentary sectional view on an enlarged scale taken along the line 4—4 in FIG. 2.

FIG. 5 is an elevational view of a portion of the apparatus.

DESCRIPTION

Referring to FIG. 1, the apparatus embodying the invention is shown in connection with a conventional forehearth 10 which retains a body of molten glass and includes a periodically operated plunger 11 that forces a charge of the glass downwardly through an opening 12 and, in turn, to an orifice ring 13 that has a plurality of spaced orifices 14 thereby delivering separate charges of molten glass, herein shown as three in number. The charges are, in turn, severed by appropriate apparatus along the line L.

In accordance with the invention, the orifice ring 13 forms a part of an orifice ring assembly 15 (FIGS. 1 and 2). The orifice ring assembly 15 comprises a support 16 that is pivoted by a pin 17 to a bracket 18 and supports an orifice pan 19. The orifice pan 19, in turn, supports a refractory insert 20 which, in turn, supports the orifice ring 13, as presently described.

As shown in FIG. 1, the support 16 includes a support ring 21 that engages a shoulder 22 on the orifice pan 19 to support the orifice pan 19. The insert 20 has a shoulder 23 that engages a radially inwardly extending flange or lip 24 on the orifice pan 19 so that the insert 20 is supported. The orifice ring 13 includes a shoulder 25 that engages the upper end of the insert 20. Orifice pan 19 includes an upwardly extending peripheral wall 26 and appropriate packed-in insulation 27 is provided between the wall 26 and the upper end of the orifice ring 13.

As further shown in FIG. 1, the outer periphery of the insert 20 and the lower portion of the orifice ring 13 are spaced from another to define a space S in which combustion occurs.

Referring specifically to FIG. 2, the insert 20 has a large opening 28 through which the portions 29, 30, 31 of the bottom wall of the orifice ring 13, which define the orifices 14, extend.

As further shown in FIG. 2, the insert 20 is provided with groups of parallel passages 32, 33, 34 which extend from the periphery of the insert 20 to the space S, the passages 32 extending to the portion of the space S surrounding the wall 29, the passages 33 extending to the portion of the space S surrounding the wall 30, and the passages 34 extending to the portion of the space S surrounding the wall 31.

As further shown in FIG. 2, the orifice pan 19 is provided with sets of openings 35, 36, 37 that communicate respectively with the passages 32, 33, 34.

Referring to FIG. 5, the openings 35, 36, 37 lie in a substantially single plane. Openings 35 extend to a groove 38 in the periphery of the side wall of the orifice pan 19. Openings 36 extend to a peripheral groove 39 while openings 37 extend to a peripheral groove 40. The grooves 38, 39 and 40 are provided in substantially vertically spaced relation and separated from one another by vertical wall portions 41, 42, 43. The outer portions of the grooves are closed by walls 44, 45, 46 thereby defining passages, the passage defined by groove 38 extending to the openings 35, the passage defined by groove 39 extending to the openings 36, and the passage defined by groove 40 extending to the openings 37.

As shown in FIGS. 1 and 2, a manifold 47 is mounted on the periphery of the orifice pan 19 by brackets 48 and comprises passages 49, 50 and 51 that extend to pipes 52, 53, 54 that are connected, respectively, to the passages defined by the grooves 40, 39, and 38.

The passages 49, 50 and 51 register with openings 55, 56, 57 in a manifold block 58 that is fixed by a screw 59 to a portion of the forehearth. The manifold block has inlets 60, 61, 62 for providing combustible fuel mixtures at varying pressures from valves V to the manifold block 58. The seal between the manifold block 58 and the manifold 47 is formed by O-rings 63 that are set into grooves in the upper ends of the passages 49, 50, 51 and sealingly engage the undersurface of the block 58. Screws 64 are threaded into the support 16 and engage the underside of the manifold 47 to vary the pressure with which the manifold 47 is urged aaginst the manifold block 58 and thereby insure a proper seal.

In use, different combustible mixtures are supplied to the manifold block 58 and flow through the manifold 47 to the passages defined by the grooves 38, 39 and 40 supplying differing combustible mixtures through the openings 35, 36, 37 to the passages 32, 33, 34 so that different combustible mixtures are provided to the portions of the space S surrounding each wall openings 29, 30 and 31. In this fashion, the temperature of each wall portion 29, 30 and 31 can be controlled. This permits an accurate control of the shape and weight of each charge or gob independently of the adjacent charge or gob.

We claim:

1. In an apparatus for feeding charges of molten glass, the combination comprising
   means for retaining a body of molten glass,
   said means having an opening extending downwardly therethrough through which molten glass is periodically directed,
   a support,
   an orifice pan having an opening therethrough,
   means for removably supporting said orifice pan on said support beneath the opening of said glass retaining means,
   an insert supported by said orifice pan and having a vertical opening,
   a refractory orifice ring having a plurality of orifices therein supported by said insert with the orifices of said orifice ring aligned with the opening of said insert,
   said orifice ring and insert having portions thereof spaced from one another to define a combustion space about each orifice defining portion of the orifice ring,
   said insert having a plurality of passages along the periphery thereof,
   said pan having circumferentially spaced inlet openings communicating with the peripheral passages in said insert,
   means for isolating each group of inlet openings in the pan which extend to the space surrounding each orifice defining portion fro the others of said groups of inlet openings,
   said means for supporting said orifice pan being movable toward and away from said glass retaining means,
   said glass retaining means having a manifold block relatively fixedly mounted thereon,
   said manifold block having separate combustible mixture inlets and supply openings therethrough communicating with said inlets,
   said orifice pan having a manifold thereon,
   said manifold having inlet passages therein communicating with the peripheral passages of said insert,
   said inlet openings of said manifold communicating with the supply openings of the manifold block when the orifice pan is adjacent the glass retaining means for supplying combustible mixture to said combustion spaces.

2. The combination set forth in claim 1 wherein said peripheral passages on said insert are vertically spaced.

3. The combination set forth in claim 1 wherein said inlet openings extend to the peripheral passages which comprise grooves which communicate with said inlet passage of said manifold.

4. The combination set forth in claim 1 including interengaging means between the support and the manifold for controlling the pressure with which the manifold is forced against the manifold block.

5. The combination set forth in claim 1 including means for selectively supplying combustible fuel to each group of inlet openings of said pan.

6. In an apparatus for feeding charges of molten glass, an orifice ring assembly comprising
   an orifice pan having an opening therethrough,
   an insert supported by said orifice pan and having an opening therethrough,
   a refractory orifice ring having a plurality of orifices therein supported by said insert with the orifice of said orifice ring aligned with the opening of said insert,
   said orifice ring and insert having portions thereof spaced from one another to define a combustion space about each orifice defining portion of the orifice ring,
   said insert having a plurality of peripherally extending passages therein,
   said pan having circumferentially spaced inlet openings communicating with the peripheral passages in said insert,
   means for isolating each group of inlet openings in the pan which extend to the space surrounding each orifice defining portion from the others of groups of inlet openings,
   a manifold block adapted to be relatively fixedly mounted on glass retaining means,
   said manifold block having separate combustible mixture inlets and supply openings therethrough communicating with said inlets,
   said orifice pan having a manifold thereon,
   said manifold having inlet passages therein communicating with the peripheral passages of said insert,
   said inlet openings of said manifold communicating with the supply openings of the manifold block when the orifice pan is adjacent the glass retaining means for supplying combustible mixture to said combustion spaces.

7. The combination set forth in claim 6 wherein said peripheral passages on said insert are vertically spaced.

8. The combination set forth in claim 6 wherein said inlet openings extend to the peripheral passages which comprise grooves which communicate with said inlet passage of said manifold.

9. The combination set forth in claim 6 including interengaging means between the support and the manifold for controlling the pressure with which the manifold is forced against the manifold block.

10. The combination set forth in claim 6 including means for selectively supplying combustible fuel to each group of inlet openings of said pan.

References Cited
UNITED STATES PATENTS

| | | | |
|---|---|---|---|
| 3,508,904 | 4/1970 | Keefer | 65—326 |
| 3,160,492 | 12/1964 | Chapman et al. | 65—128 |
| 3,516,812 | 6/1970 | Donnelly et al. | 65—128 X |

S. LEON BASHORE, Primary Examiner

R. L. LINDSAY, JR., Assistant Examiner

U.S. Cl. X.R.

65—128, 330, 331, 332